United States Patent
Barriac et al.

(10) Patent No.: US 10,091,817 B2
(45) Date of Patent: Oct. 2, 2018

(54) BACKOFF MECHANISM FOR DYNAMIC CLEAR CHANNEL ASSESSMENT (CCA)

(71) Applicant: QUALCOMM Incorporated, San Diego, CA (US)

(72) Inventors: Gwendolyn Denise Barriac, Encinitas, CA (US); George Cherian, San Diego, CA (US); Simone Merlin, San Diego, CA (US); Alfred Asterjadhi, San Diego, CA (US); Yan Zhou, San Diego, CA (US); Qingjiang Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 15/342,906

(22) Filed: Nov. 3, 2016

(65) Prior Publication Data

US 2017/0135133 A1    May 11, 2017

Related U.S. Application Data

(60) Provisional application No. 62/252,368, filed on Nov. 6, 2015.

(51) Int. Cl.
*H04W 74/08* (2009.01)
*H04W 72/04* (2009.01)
(Continued)

(52) U.S. Cl.
CPC ....... *H04W 74/0808* (2013.01); *H04W 52/50* (2013.01); *H04W 72/0473* (2013.01); *H04W 52/287* (2013.01); *H04W 74/0816* (2013.01)

(58) Field of Classification Search
CPC ............. H04W 74/0808; H04W 52/50; H04W 72/0473
See application file for complete search history.

(56) References Cited

U.S. PATENT DOCUMENTS 9,374,821 B2    6/2016 Kwon
2010/0195601 A1*   8/2010 Zhang .................. H04W 74/04
                                                        370/329
(Continued)

FOREIGN PATENT DOCUMENTS

WO    WO-2014178502 A1    11/2014
WO    WO2015112780 A1      7/2015
(Continued)

OTHER PUBLICATIONS

Okuhara, et al., "Attenuators Enable Inversely Proportional Transmission Power and Carrier Sense Threshold Setting in WLANs," 2014 IEEE 25th Annual International Symposium on Personal, Indoor, and Mobile Radio Communication (PIMRC), Sep. 2, 2014, pp. 986-990, XP032789680, Institute of Electrical and Electronics Engineers, Piscataway, NJ, USA.

(Continued)

*Primary Examiner* — Siming Liu
(74) *Attorney, Agent, or Firm* — Holland & Hart LLP

(57) ABSTRACT

A wireless first device may receive a packet from another device from an overlapping basic service set (OBSS). A received power of the packet may be greater than a threshold for transmitting during the time of the packet. If the first device reduces its transmit power, the first device may increase the threshold. If the received power is less than the increased threshold, the first device may count down a backoff count during a transmission time or transmission opportunity of the packet. In some cases, after the transmission time or transmission opportunity, the first device may increase its transmission power. In some cases, the condition for counting down a backoff count may also include initiating or finishing the transmission during the transmission time or the transmission opportunity of the packet, or transmitting at the reduced power.

32 Claims, 13 Drawing Sheets

(51) Int. Cl.
  *H04W 52/50* (2009.01)
  *H04W 52/28* (2009.01)

(56) References Cited

U.S. PATENT DOCUMENTS

2015/0358904 A1 12/2015 Kwon et al.
2016/0081031 A1 3/2016 Barriac et al.

FOREIGN PATENT DOCUMENTS

WO  WO 2015144200 A1 * 10/2015 ............ H04W 28/18
WO  WO-2015144200 A1   10/2015

OTHER PUBLICATIONS

ISA/EP, International Search Report and Written Opinion of the International Searching Authority, Int'l Application No. PCT/US2016/060516, dated Feb. 8, 2017, European Patent Office, Rijswijk, NL, 14 pgs.
Pelechrinis, et al., "Detecting Selfish Exploitation of Carrier Sensing in 802.11 Networks," IEEE Infocom 2009, The 28th Conference on Computer Communications, Apr. 19, 2009, pp. 657-665, XP031468812, Institute of Electrical and Electronics Engineers, Piscataway, NJ, USA.
Samsung, "CCA Threshold and Transmission Power for LAA," 3GPP TSG RAN WG1 Meeting #82, R1-154139, Beijing, China, Aug. 24-28, 2015, 4 pgs., XP051001509, 3rd Generation Partnership Project.
Sanabria-Russo L., et al., "Collision-free Operation in High Density WLAN Deployments", Computer Science Networking and Internet Architecture, Jul. 28, 2016, pp. 1-15.

* cited by examiner

BACKOFF MECHANISM FOR DYNAMIC CLEAR CHANNEL ASSESSMENT (CCA)

CROSS REFERENCES

The present application for patent claims priority to U.S. Provisional Patent Application No. 62/252,368 by BARRIAC, et al., entitled "BACKOFF MECHANISM FOR DYNAMIC CLEAR CHANNEL ASSESSMENT (CCA)," filed Nov. 6, 2015, assigned to the assignee hereof, and is hereby expressly incorporated by reference herein in its entirety.

BACKGROUND

The following relates generally to wireless communication, and more specifically to a backoff mechanism for dynamic clear channel assessment (CCA).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a wireless fidelity (Wi-Fi) (i.e., IEEE 802.11) network may include an access point (AP) that may communicate with one or more stations (STAs) or mobile devices.

The AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

A group of STAs that are communicating with an AP may be known as a basic service set (BSS). In some cases, the area of one BSS may overlap with the area of another BSS. This may be known as an overlapping BSS (OBSS). Transmissions from devices within an OBSS may be detected during a listen-before-talk (LBT) procedure, and the transmissions may prevent a device from gaining access to a channel. This may accordingly result in communication delays or disruptions.

SUMMARY

A wireless device (e.g., a first device) may receive a packet from another device within an overlapping basic service set (OBSS). The packet may be received having a received power, which may be greater than a threshold used by the first device for dropping the OBSS packet. In other words, if the received power of the packet is greater than the threshold, the first device may be required to abstain from transmitting during a transmission time of the packet. However, if the first device reduces its own transmit power, the first device may also increase the threshold. Thus, if the received power of a received packet is then less than the increased threshold, the first device may count down a backoff count during the transmission time or transmission opportunity of the packet. In some cases, after the transmission time or transmission opportunity, the first device may increase its transmission power. In some cases, a condition for counting down the backoff count may also include initiating or finishing a transmission during the transmission time or the transmission opportunity of the packet, or transmitting at or below the reduced power.

A method of wireless communication is described. The method may include receiving a packet from a device in an OBSS, wherein a received power of the packet is greater than a first power threshold that is associated with a first transmission power, determining that a backoff condition has been satisfied, increasing the first power threshold to a higher power level in the form of a second power threshold, and selecting, based at least in part on the backoff condition being satisfied, a second transmission power for a transmission, wherein the second transmission power is less than the first transmission power and is associated with the second power threshold.

An apparatus for wireless communication is described. The apparatus may include means for receiving a packet from a device in an OBSS, wherein a received power of the packet is greater than a first power threshold that is associated with a first transmission power, means for determining that a backoff condition has been satisfied, increasing the first power threshold to a higher power level in the form of a second power threshold, and means for selecting, based at least in part on the backoff condition being satisfied, a second transmission power for a transmission, wherein the second transmission power is less than the first transmission power and is associated with the second power threshold.

A further apparatus is described. The apparatus may include a processor, memory in electronic communication with the processor, and instructions stored in the memory. The instructions may be operable to cause the processor to receive a packet from a device in an OBSS, wherein a received power of the packet is greater than a first power threshold that is associated with a first transmission power, determine that a backoff condition has been satisfied, increase the first power threshold to a higher power level in the form of a second power threshold, and select, based at least in part on the backoff condition being satisfied, a second transmission power for a transmission, wherein the second transmission power is less than the first transmission power and is associated with the second power threshold.

A non-transitory computer readable medium for wireless communication is described. The non-transitory computer-readable medium may include instructions to cause a processor to receive a packet from a device in an OBSS, where a received power of the packet is greater than a first power threshold that is associated with a first transmission power, determine that a backoff condition has been satisfied, increase the first power threshold to a higher power level in the form of a second power threshold, and select, based at least in part on the backoff condition being satisfied, a second transmission power for a transmission, where the second transmission power is less than the first transmission power and is associated with the second power threshold.

Some examples of the method, apparatus, or non-transitory computer-readable medium described above may further include processes, features, means, or instructions for decrementing a backoff count during a transmission time of the packet or a transmission opportunity of the packet based on the determination that the backoff condition has been satisfied.

Some examples of the method, apparatus, or non-transitory computer-readable medium described above may further include processes, features, means, or instructions for determining that the transmission time of the packet or the transmission opportunity of the packet has passed. Some examples of the method, apparatus, or non-transitory computer-readable medium described above may further include processes, features, means, or instructions for selecting a third transmission power for the packet based on the determination that the transmission time of the packet or the transmission opportunity of the packet has passed, where the third transmission power is greater than the second transmission power.

Some examples of the method, apparatus, or non-transitory computer-readable medium described above may further include processes, features, means, or instructions for determining that a backoff countdown has reached zero after the time period of the packet has passed. Some examples of the method, apparatus, or non-transitory computer-readable medium described above may further include processes, features, means, or instructions for sending the transmission at the third transmission power.

In some examples of the method, apparatus, or non-transitory computer-readable medium described above, determining that the backoff condition has been satisfied comprises: determining that the received power is less than a maximum power threshold. Some examples of the method, apparatus, or non-transitory computer-readable medium described above may further include processes, features, means, or instructions for sending the transmission at the second transmission power based at least in part on the determining. In some examples of the method, apparatus, or non-transitory computer-readable medium described above, determining that the backoff condition has been satisfied comprises: determining that a start time of the transmission, a completion time of the transmission, or both fall within the transmission time of the packet or the transmission opportunity of the packet.

Some examples of the method, apparatus, or non-transitory computer-readable medium described above may further include processes, features, means, or instructions for determining that a backoff countdown has reached zero during the transmission time of the packet or the transmission opportunity of the packet. Some examples of the method, apparatus, or non-transitory computer-readable medium described above may further include processes, features, means, or instructions for sending the transmission at the second transmission power.

In some examples of the method, apparatus, or non-transitory computer-readable medium described above, determining that the backoff condition has been satisfied comprises: determining that a final transmission power for the transmission is less than or equal to the second transmission power. Some examples of the method, apparatus, or non-transitory computer-readable medium described above may further include processes, features, means, or instructions for determining that a backoff countdown has reached zero. Some examples of the method, apparatus, or non-transitory computer-readable medium described above may further include processes, features, means, or instructions for sending the transmission at the final transmission power.

DETAILED DESCRIPTION

In some wireless communications systems, a transmitting wireless device, such as a station (STA) or an access point (AP), that is part of a basic service set (BSS) may perform a clear channel assessment (CCA) procedure to determine the availability of the radio frequency spectrum used for communication. Multiple BSSs can be in relative close proximity, and transmissions from an overlapping BSS (OBSS) may impact the ability of a device to win the channel. For example, if a STA detects a packet from another device, the STA may be required to abstain from transmitting during the time of the detected packet if the receive power of the detected packet is above a threshold (e.g., an OBSS preamble detection (PD) threshold level). However, if a STA detects a packet from another device, it may still transmit if the received power of the packet is less than a threshold. In some cases, a STA may increase the threshold if the STA's transmit (Tx) power is correspondingly decreased by some amount.

When a STA detects a packet from another device, the STA may initiate a backoff procedure before transmitting its own transmission. If the backoff procedure has already been initiated, the STA may continue the backoff procedure. The backoff procedure may include decrementing a backoff count if the received power of the packet is below a threshold. In some cases, the threshold may be increased if the Tx power of the STA is decreased, thus allowing the backoff countdown to continue. In a first example, if the backoff countdown reaches zero after the transmission time of the packet has passed, the STA may correspondingly increase its transmission power and decrease the OBSS PD threshold level back to their default values. In another example, if a STA detects an OBSS packet with power above the OBSS PD threshold level, the STA may increase the OBSS PD threshold and continue to count down a backoff timer on the condition that the STA correspondingly decreases its Tx power and that the STA starts (and/or finishes) the next transmission within a transmission time of the OBSS packet (or a transmission opportunity (TXOP)). Additionally or alternatively, if the STA increases the OBSS PD threshold to continue the countdown, it may correspondingly lower its Tx power, and transmit at or lower than the decreased power level, regardless of when the transmission occurs.

Aspects of the disclosure are initially described in the broader context of a wireless communication system. Aspects of the disclosure are further illustrated by and described with reference to apparatus diagrams, system diagrams, and flowcharts that relate to a backoff mechanism for dynamic CCA.

Figure 1:
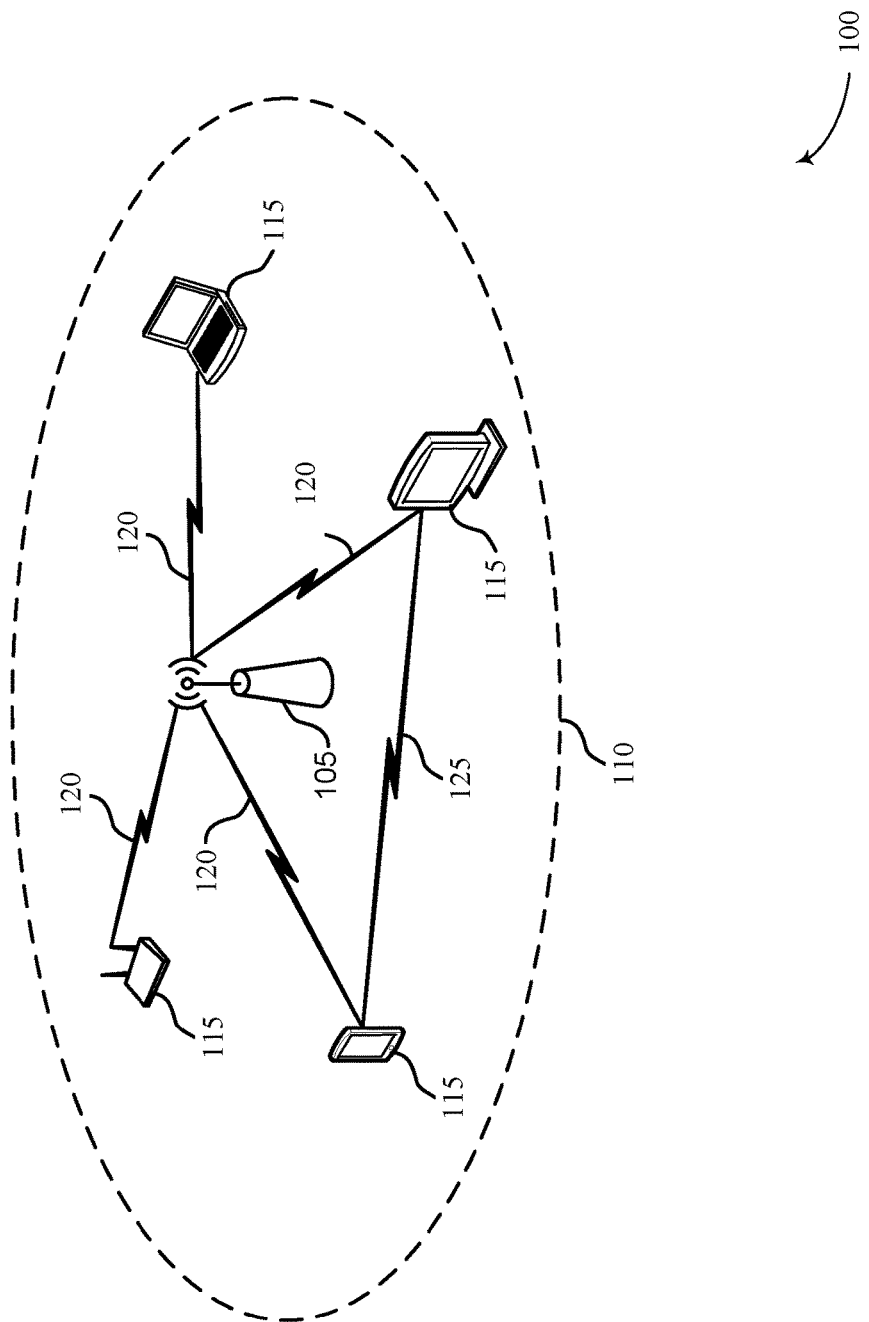
FIG. 1 illustrates an example of a wireless communications system that supports a backoff mechanism for dynamic clear channel assessment (CCA) in accordance with aspects of the present disclosure.

FIG. 1 illustrates a wireless local area network (WLAN) 100 (also known as a Wi-Fi network) that supports a backoff mechanism for dynamic CCA in accordance with various aspects of the present disclosure. WLAN 100 may include an AP 105 and multiple associated STAs 115, which may represent devices such as mobile stations, personal digital assistant (PDA), other handheld devices, netbooks, notebook computers, tablet computers, laptops, display devices (e.g., TVs, computer monitors, etc.), printers, etc. AP 105 and the associated STAs 115 may represent a BSS or an extended service set (ESS). Accordingly, AP 105 may communicate with one or more STAs 115 over wireless links 120.

The various STAs 115 in the network may communicate with one another through AP 105. Also shown is a coverage area 110 of AP 105, which may represent a basic service area (BSA) of WLAN 100. An extended network station (not shown) associated with WLAN 100 may be connected to a wired or wireless distribution system that may allow multiple APs 105 to be connected in an ESS. WLAN 100 may also support the use of various transmission powers based on backoff conditions related to a received packet. Two of more BSSs that have overlapping coverage areas may be known as OBSSs.

Note that BSSs may be considered overlapping even if only some of the STA coverage areas in each BSS overlap. In these instances, a STA 115 may communicate with an AP 105 while in the presence of interfering transmissions from other OBSSs. In some cases, the STA 115 may detect interfering transmissions (e.g., during a CCA) from an OBSS. While this example is described for STA 115, similar techniques may be used by AP 105 as well. After detecting the interfering transmission, STA 115 may then identify whether the interfering transmission is associated with an OBSS. If the interfering transmission is not associated with an OBSS (e.g., a transmission from another wireless device in the current BSS), STA 115 should defer to the transmission.

Although not shown in FIG. 1, a STA 115 may also be associated with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). WLAN 100 may include APs 105 of different types (e.g., metropolitan area, home network, etc.), with varying and overlapping coverage areas 110. Two STAs 115 may also communicate directly via direct wireless links 125, regardless of whether both STAs 115 are in the same coverage area 110. Examples of direct wireless links 125 may include Wi-Fi Direct connections, Wi-Fi Tunneled Direct Link Setup (TDLS) links, and other group connections. STAs 115 and APs 105 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11ac, 802.11ad, 802.11ah, etc. In other implementations, peer-to-peer connections or ad hoc networks may be implemented within WLAN 100.

WLAN 100 may operate on two primary levels: the MAC of the data link layer and the PHY layer. The MAC sub-layer includes the distributed coordination function (DCF) and point coordination function inter-frame space (PCF). The DCF may be the basic access method, and may also be known as carrier sense multiple access with collision avoidance (CSMA/CA). In DCF, each STA 115 may access the network independently using a collision avoidance protocol. For example, a STA 115 may wait for a distributed coordination function inter-frame space (DIFS) plus a random backoff period prior to transmitting to check whether another STA 115 is using the channel. The DCF may be implemented in all STAs 115. PCF may be implemented in selected STAs 115. In PCF, a single AP 105 coordinates the access for other STAs 115. DCF and the PCF may operate concurrently within the same BSS. For example, the two access methods may alternate, with a contention free period (CFP) for PCF followed by a contention period (CP) for DCF. A hybrid coordination function (HCF) may also be used, in which different traffic types are assigned different access priorities.

A STA 115 or AP 105 may operate in a shared or unlicensed frequency spectrum. These wireless devices may perform a CCA prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power is that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence.

In some cases, after identifying an interfering transmission is associated with an OBSS, the STA 115 may compare an RSSI or power density of the interfering transmission with an OBSS threshold value. If the RSSI or power density is above the OBSS threshold, STA 115 may refrain from transmitting in accordance with a collision-based protocol. Conversely, if the RSSI or power density is below the OBSS threshold, STA 115 may conduct transmissions to AP 105 concurrently with the interfering transmission. In this way, OBSSs may reuse communication resources and increase throughput within the network. An interfering transmission may include a WLAN packet, which may include a preamble and a data region. In some instances, the STA 115 could reduce its transmit power to increase the OBSS threshold value so that it may transmit on top of the OBSS packet. If a STA 115 detects a clear channel, or if the OBSS received power is below a threshold, the STA 115 may count down a backoff timer. When the backoff count reaches zero, the STA 115 may transmit on the channel.

Thus, a STA 115 or an AP 105 may receive a packet from another device in an OBSS where the received power is greater than a threshold for transmitting during the time of the packet. If the STA 115 or AP 105 reduces its transmit power, it may increase the threshold. If the received power is less than the increased threshold, the STA 115 or AP 105 may count down a backoff count during a transmission time (or a TXOP) of the packet. In some cases, after the transmission time (or TXOP), the STA 115 or AP 105 may increase its transmission power. In some cases, the condition for counting down the backoff count may also include initiating or finishing the transmission during the transmission time (or TXOP) of the packet, or transmitting at or below the reduced power.

Figure 2:
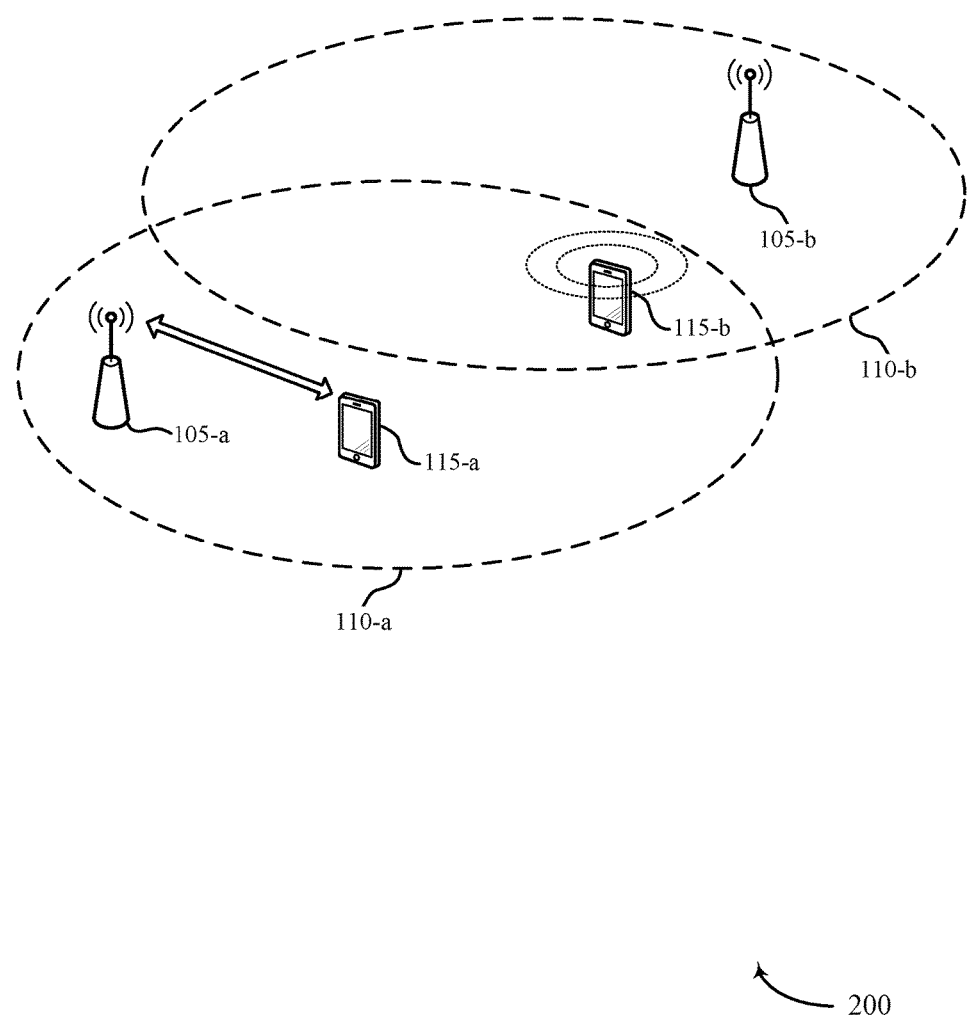
FIG. 2 illustrates an example of a wireless communications system that supports a backoff mechanism for dynamic CCA in accordance with aspects of the present disclosure.

FIG. 2 illustrates an example of a wireless communications system 200 that supports a backoff mechanism for dynamic CCA in accordance with various aspects of the present disclosure. Wireless communications system 200 may include AP 105-*a* and STA 115-*a* associated with a first BSS with a coverage area 110-*a*. Wireless communications system 200 may also include AP 105-*b* and STA 115-*b*, which may be associated with an OBSS having a coverage area 110-*b* that overlaps coverage area 110-*a*. AP 105-*a*, AP 105-*b*, STA 115-*a*, and STA 115-*b* may all communicate with one another and may be examples of the corresponding devices described with reference to FIG. 1. Additionally, the examples described below with reference to a STA 115 may be performed by any wireless device. Wireless communications system 200 may implement backoff procedures that use adjusted OBSS PD thresholds and Tx power levels when attempting to transmit over a wireless channel.

In wireless communications system 200, a transmitting wireless device (e.g., STA 115-*a* or AP 105-*a*) may perform a CCA procedure to determine the availability of the radio frequency spectrum used for communication. In some cases, multiple BSSs can be in relative close proximity, and interference from another wireless device in an OBSS may affect the transmission of STA 115-*a*. STA 115-*a* may detect a preamble from a wireless device in the OBSS (e.g., a preamble from a transmission by STA 115-*b*) and initiate a backoff procedure before transmitting. The backoff procedure may include decrementing a backoff count and determining whether the channel is free when the backoff countdown has reached zero.

In some cases, STA 115-*a* can increase an OBSS PD threshold level if its Tx power is correspondingly decreased. That is, STA 115-*a* may increase an OBSS PD threshold and subsequently detect a valid OBSS physical layer convergence procedure (PLCP) protocol data unit (PPDU). STA 115-*a* may discard the PPDU if the receive (Rx) power of the PPDU is below the OBSS PD threshold and certain conditions are met. The OBSS PD threshold may be accompanied by a Tx power level value, and the increase of the OBSS PD threshold level may be accompanied by a reduction of STA 115-*a* Tx power.

Techniques for backoff procedures used by STAs 115 in such situations may be implemented using different options. For example, STA 115-*a* may detect an OBSS packet from STA 115-*b* with a power level greater than the OBSS PD power threshold. STA 115-*a* may increase the OBSS PD threshold level and count down a backoff count when correspondingly decreasing Tx power. In such instances, the Tx power may be reduced while the OBSS PD threshold level holds for the duration of the received OBSS packet. Additionally or alternatively, the decreased power level and increased OBSS PD threshold level may hold for the duration of an OBSS TXOP. In some cases, at the end of the OBSS packet (or at the end of the OBSS TXOP), STA 115-*a* may return the OBSS PD threshold and Tx power levels to their nominal values. In some cases, STA 115-*a* may be able to decrement a backoff count regardless of the incoming power of the OBSS packet. Therefore, a maximum OBSS PD threshold value may be used by STA 115-*a* so that it may defer transmission when an OBSS packet is received with a power level that is greater than the maximum OBSS PD threshold value.

In another example, if STA 115-*a* detects an OBSS packet with a power level above the OBSS PD threshold, STA 115-*a* may increase the OBSS PD threshold level so that it can continue to decrement a backoff count if it correspondingly decreases its Tx power and the remaining countdown may be completed within the duration of the OBSS packet or the OBSS TXOP. Additionally or alternatively, the remaining countdown of the backoff count may be completed within the duration of the OBSS packet (or the TXOP) and a transmission by STA 115-*a* may also be completed within the OBSS packet (or TXOP). That is, when STA 115-*a* detects an OBSS packet with a power level above the OBSS PD threshold, it may increase the OBSS PD if STA 115-*a* correspondingly decreases its Tx power and also starts or finishes a next transmission within the OBSS packet (or TXOP) duration.

In some cases, when STA 115-*a* detects an OBSS packet with a power above its OBSS PD level, it may increase the OBSS PD level so that it can continue to count down a backoff timer if it correspondingly decreases its Tx power to a certain value and if the Tx power of the next transmission from STA 115-*a* is not greater than that value. That is, STA 115-*a* may transmit following the detection of an OBSS packet if it sends a next packet at a decreased power level, regardless of when that transmissions starts.

Figure 3:
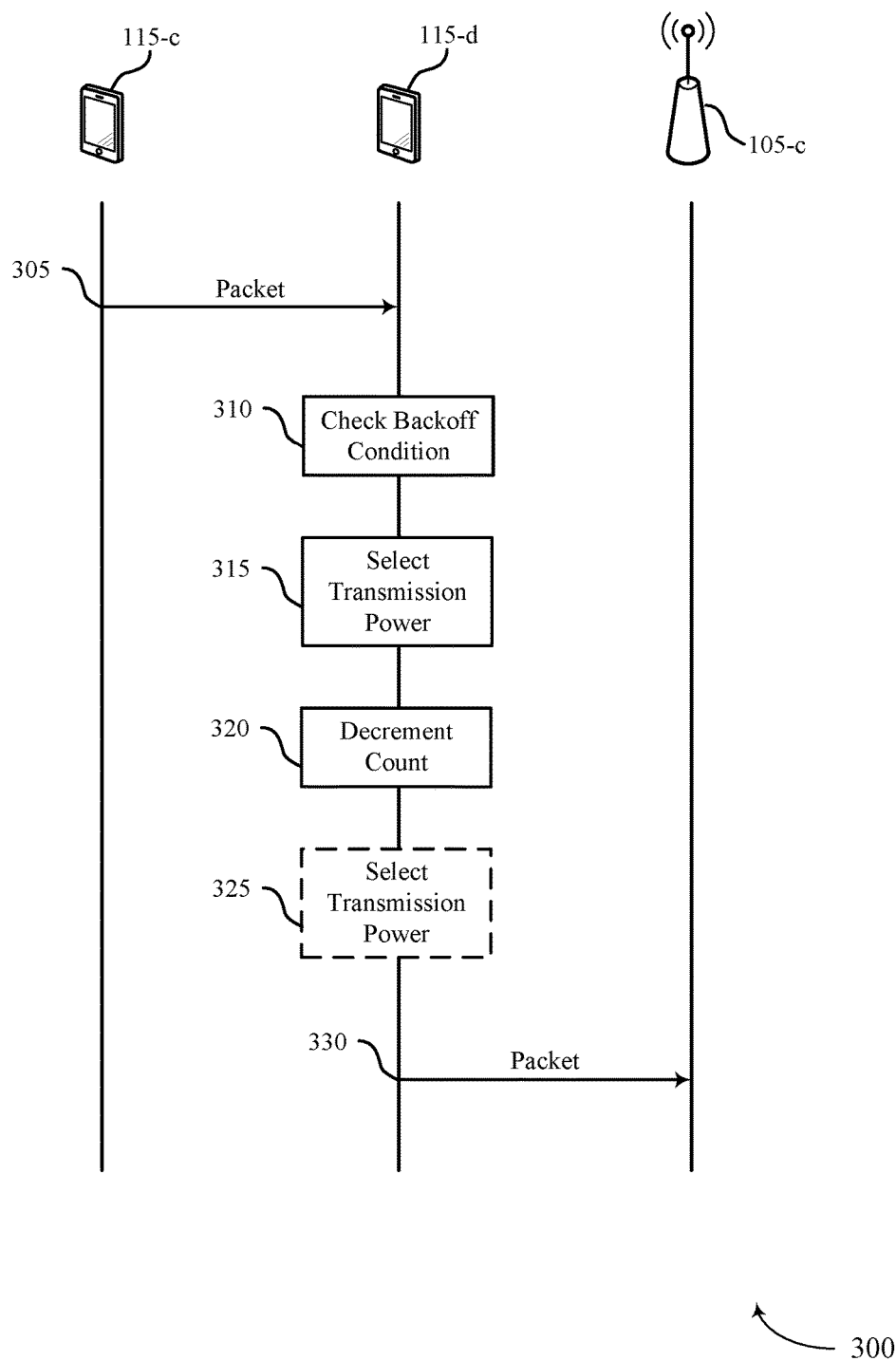
FIG. 3 illustrates an example of a process flow in a system that supports a backoff mechanism for dynamic CCA in accordance with aspects of the present disclosure.

FIG. 3 illustrates an example of a process flow 300 in a system that supports a backoff mechanism for dynamic CCA in accordance with various aspects of the present disclosure. Process flow 300 may include AP 105-*c*, STA 115-*c*, and STA 115-*d*, which may be examples of the corresponding devices described with reference to FIGS. 1 and 2. STA 115-*c* may be part of an OBSS that overlaps with a BSS including STA 115-*d* and AP 105-*c*.

At step 305, STA 115-*d* may receive a packet from a device (e.g., STA 115-*c*) in an OBSS, where the received power of the packet is greater than a first power threshold associated with a first transmission power. At step 310, STA 115-*d* may check whether a backoff condition has been satisfied. In some cases, determining that the backoff condition has been satisfied may include determining that the received power is less than a maximum power threshold, or determining that a start time of a transmission (e.g., a transmission by STA 115-*d*), a completion time of the transmission, or both, fall within a transmission time of the packet or a transmission opportunity of the packet. In some cases, determining that the backoff condition has been satisfied may include determining that a final transmission power for the transmission is less than or equal to a second transmission power.

At step 315, if the backoff condition is satisfied, STA 115-*d* may select the second transmission power for the transmission, where the second transmission power is less than the first transmission power and is associated with a second power threshold that is greater than the first power threshold. At step 320, STA 115-*d* may decrement a backoff count during the transmission time of the packet or the transmission opportunity of the packet (e.g., the transmission time or the TXOP) based on the backoff condition.

Optionally, at step 325, STA 115-*d* may determine that the transmission time of the packet, or the transmission opportunity of the packet, has passed and select a third transmission power for the packet based on the determination that the transmission time of the packet or the transmission opportunity of the packet has passed. In some examples, the third transmission power may be greater than the second transmission power. In some cases, STA 115-*d* may be restricted from increasing the transmit power if STA 115-*d* counted down the backoff count during the transmission of the received packet.

At step 330, STA 115-*d* may determine that a backoff countdown has reached zero after the transmission time of the packet or the transmission opportunity of the packet has passed and may send the transmission at the second transmission power or at the third transmission power. Additionally or alternatively, STA 115-*d* may determine that the backoff countdown has reached zero and may send the transmission at the final transmission power.

Figure 4:
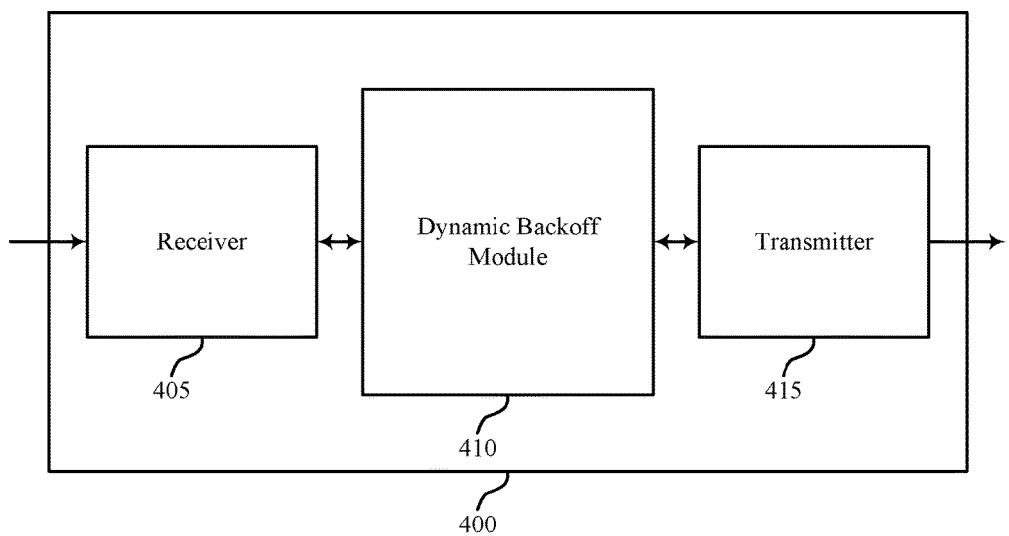
FIGS. 4 through 6 show block diagrams of a wireless device that supports a backoff mechanism for dynamic CCA in accordance with aspects of the present disclosure.

FIG. 4 shows a block diagram of a wireless device 400 that supports a backoff mechanism for dynamic CCA in accordance with various aspects of the present disclosure. Wireless device 400 may be an example of aspects of a STA 115 or AP 105 described with reference to FIGS. 1, 2, and 3. Wireless device 400 may include receiver 405, dynamic backoff module 410, and transmitter 415. Wireless device 400 may also include a processor. Each of these components may be in communication with each other.

The receiver 405 may receive information such as packets, user data, or control information associated with various information channels (e.g., control channels, data channels, and information related to a backoff mechanism for dynamic CCA, etc.). Information may be passed on to other components of the device. The receiver 405 may be an example of aspects of the transceiver 725 described with reference to FIG. 7.

The dynamic backoff module 410 may receive a packet from a device in an OBSS, where a received power of the packet is greater than a first power threshold that is associated with a first transmission power. The dynamic backoff module 410 may determine that a backoff condition has been satisfied, and select, based on the backoff condition being satisfied, a second transmission power for a transmission, where the second transmission power is less than the first transmission power and is associated with a second power threshold that is greater than the first power threshold. The dynamic backoff module 410 may also be an example of aspects of the dynamic backoff module 705 or the dynamic backoff module 805 described with reference to FIGS. 7 and 8.

The transmitter 415 may transmit signals received from other components of wireless device 400. In some examples, the transmitter 415 may be collocated with a receiver in a transceiver module. For example, the transmitter 415 may be an example of aspects of the transceiver 725 described with reference to FIG. 7. The transmitter 415 may include a single antenna, or it may include a plurality of antennas.

Figure 5:
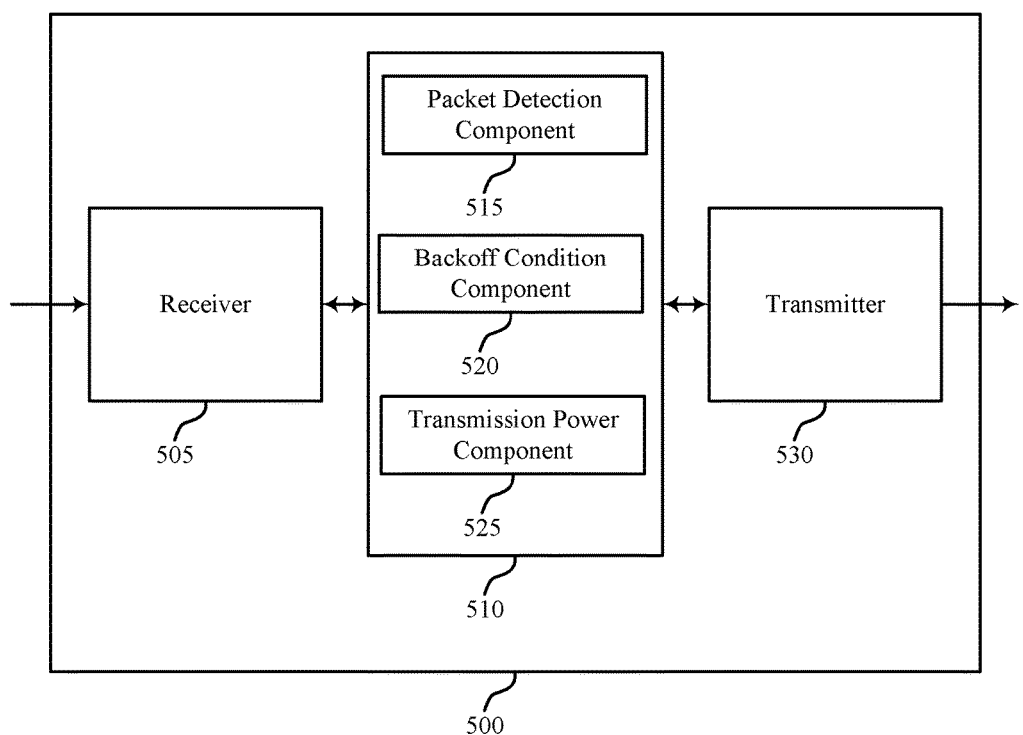

FIG. 5 shows a block diagram of a wireless device 500 that supports a backoff mechanism for dynamic CCA in accordance with various aspects of the present disclosure. Wireless device 500 may be an example of aspects of a wireless device 400, a STA 115, or an AP 105 described with reference to FIGS. 1 through 4. Wireless device 500 may include receiver 505, dynamic backoff module 510, and transmitter 530. Wireless device 500 may also include a processor. Each of these components may be in communication with each other.

The receiver 505 may receive information which may be passed on to other components of the device. The receiver 505 may also perform the functions described with reference to the receiver 405 of FIG. 4. The receiver 505 may be an example of aspects of the transceiver 725 described with reference to FIG. 7.

The dynamic backoff module 510 may be an example of aspects of dynamic backoff module 410 described with reference to FIG. 4. The dynamic backoff module 510 may include packet detection component 515, backoff condition component 520, and transmission power component 525. The dynamic backoff module 510 may be an example of aspects of the dynamic backoff module 705 or the dynamic backoff module 805 described with reference to FIGS. 7 and 8.

The packet detection component 515 may receive a packet from a device in an OBSS, where a received power of the packet is greater than a first power threshold that is associated with a first transmission power. The backoff condition component 520 may determine that a backoff condition has been satisfied. In some cases, determining that the backoff condition has been satisfied includes determining that a final transmission power for the transmission is less than or equal to the second transmission power.

The transmission power component 525 may select a transmission power for a transmission and transmit at the selected power (in coordination with transmitter 530). For example, the transmission power component 525 may select, based on the backoff condition being satisfied, a second transmission power for a transmission, where the second transmission power is less than the first transmission power and is associated with a second power threshold that is greater than the first power threshold. Additionally, the transmission power component 525 may send the transmission at the second transmission power. In some cases, the transmission power component 525 may select a third transmission power for the packet based on the determination that the transmission time of the packet or the transmission opportunity of the packet has passed, where the third transmission power is greater than the second transmission power. In such cases, the transmission power component 525 may send the transmission at the third transmission power, or send the transmission at a final transmission power.

The transmitter 530 may transmit signals received from other components of wireless device 500. In some examples, the transmitter 530 may be collocated with a receiver in a transceiver module. For example, the transmitter 530 may be an example of aspects of the transceiver 725 described with reference to FIG. 7. The transmitter 530 may utilize a single antenna, or it may utilize a plurality of antennas.

Figure 6:
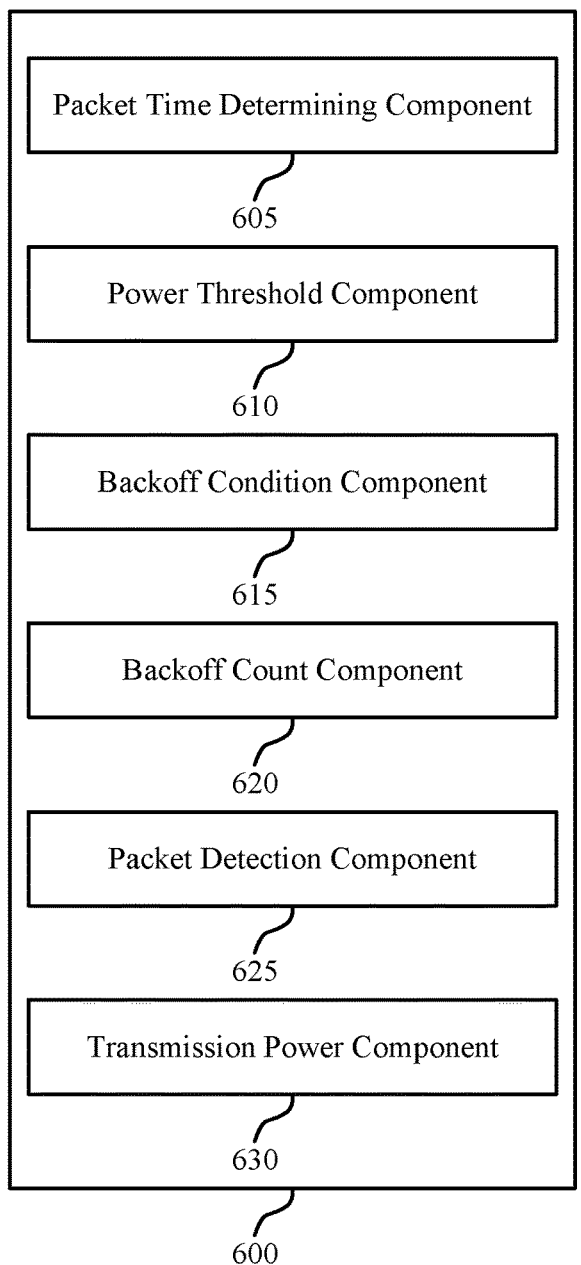

FIG. 6 shows a block diagram of a dynamic backoff module 600, which may be an example of the corresponding component of wireless device 400 or wireless device 500. That is, dynamic backoff module 600 may be an example of aspects of dynamic backoff module 410 or dynamic backoff module 510 described with reference to FIGS. 4 and 5. The dynamic backoff module 600 may also be an example of aspects of the dynamic backoff module 705 or the dynamic backoff module 805 described with reference to FIGS. 7 and 8.

The dynamic backoff module 600 may include packet time determining component 605, power threshold component 610, backoff condition component 615, backoff count component 620, packet detection component 625, and transmission power component 630. Each of these modules may communicate, directly or indirectly, with one another (e.g., via one or more buses).

The packet time determining component 605 may determine that a transmission time of a packet or a transmission opportunity of the packet has passed. The power threshold component 610 may be configured such that determining that a backoff condition has been satisfied includes determining that a received power is less than a maximum power threshold. The backoff condition component 615 may determine that the backoff condition has been satisfied. In some cases, determining that the backoff condition has been satisfied includes determining that a start time of a transmission, a completion time of the transmission, or both fall within the transmission time of the packet or the transmission opportunity of the packet.

The backoff count component 620 may determine that a backoff countdown has reached zero after the transmission time of the packet or the transmission opportunity of the packet has passed, determine that a backoff countdown has reached zero during the transmission time of the packet or the transmission opportunity of the packet, or determine that a backoff countdown has reached zero. In some cases, the backoff count component 620 may decrement a backoff count during the transmission time of the packet or the transmission opportunity of the packet based on the determination that the backoff condition has been satisfied.

The packet detection component 625 may receive a packet from a device in an OBSS, where a received power of the packet is greater than a first power threshold that is associated with a first transmission power. The transmission power component 630 may select a transmission power for a transmission and transmit at the selected power.

Figure 7:
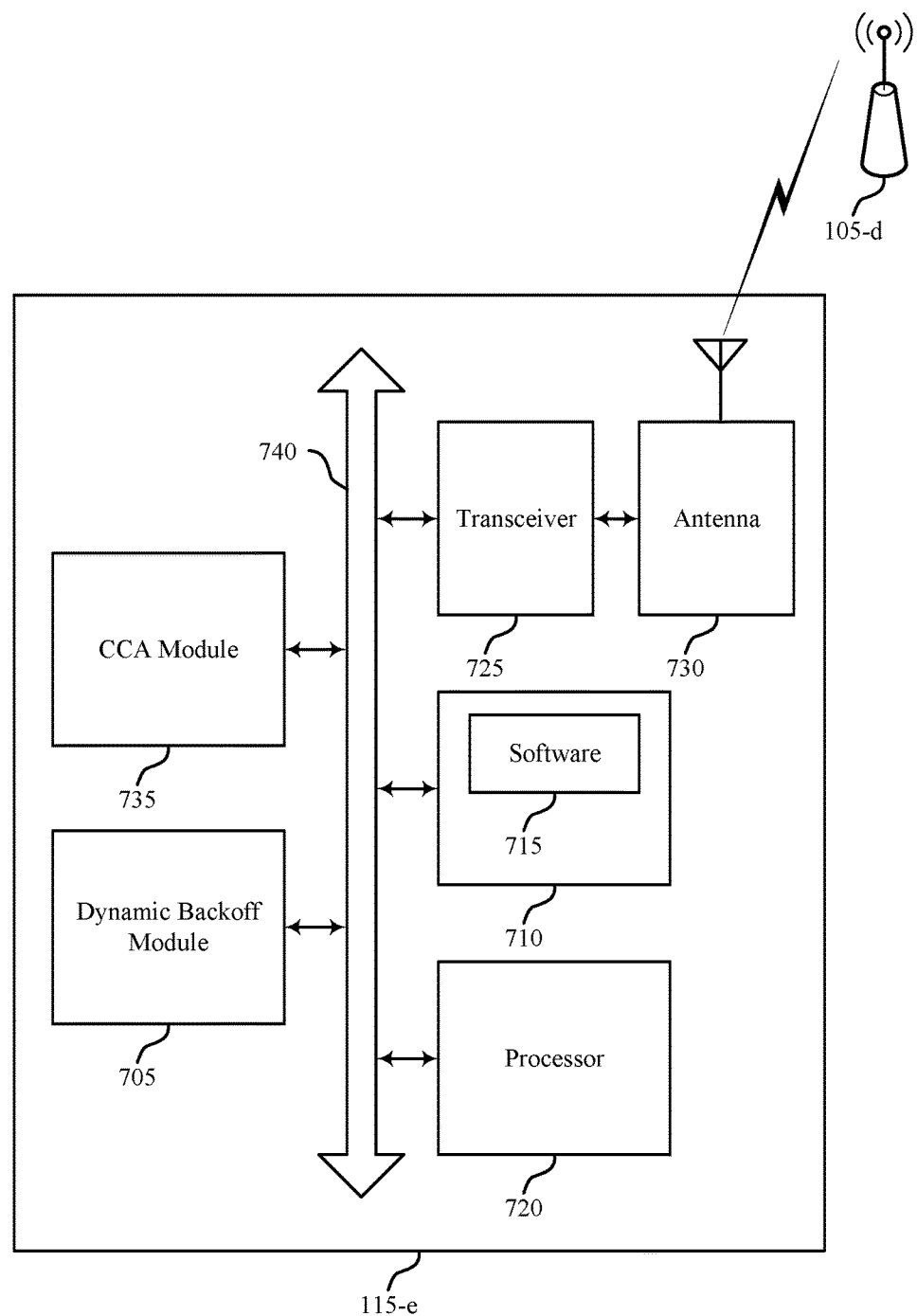
FIG. 7 illustrates a block diagram of a system including a station (STA) that supports a backoff mechanism for dynamic CCA in accordance with aspects of the present disclosure.

FIG. 7 shows a diagram of a system 700 including a device that supports a backoff mechanism for dynamic CCA in accordance with various aspects of the present disclosure. For example, system 700 may include STA 115-e, which may be an example of a wireless device 400, a wireless device 500, or a STA 115 as described with reference to FIGS. 1 through 6.

STA 115-e may also include dynamic backoff module 705, memory 710, processor 720, transceiver 725, antenna 730, and CCA module 735. Each of these modules may communicate, directly or indirectly, with one another (e.g., via one or more buses 740). The dynamic backoff module 705 may be an example of a dynamic backoff module as described with reference to FIGS. 4 through 6.

The memory 710 may include random access memory (RAM) and read only memory (ROM). The memory 710 may store computer-readable, computer-executable software including instructions that, when executed, cause the processor to perform various functions described herein (e.g., backoff mechanisms for dynamic CCA, etc.). In some cases, the software 715 may not be directly executable by the processor but may cause a computer (e.g., when compiled and executed) to perform functions described herein. The processor 720 may include an intelligent hardware device, (e.g., a central processing unit (CPU), a microcontroller, an application specific integrated circuit (ASIC), etc.).

The transceiver 725 may communicate bi-directionally, via one or more antennas, wired, or wireless links, with one or more networks, as described above. For example, the transceiver 725 may communicate bi-directionally with an AP 105 or a STA 115. The transceiver 725 may also include a modem to modulate the packets and provide the modulated packets to the antennas for transmission, and to demodulate packets received from the antennas. In some cases, the wireless device may include a single antenna 730. However, in some cases the device may have more than one antenna 730, which may be capable of concurrently transmitting or receiving multiple wireless transmissions. The CCA module 735 may perform a listen-before-talk (LBT) procedure including a CCA, as described above.

Figure 8:
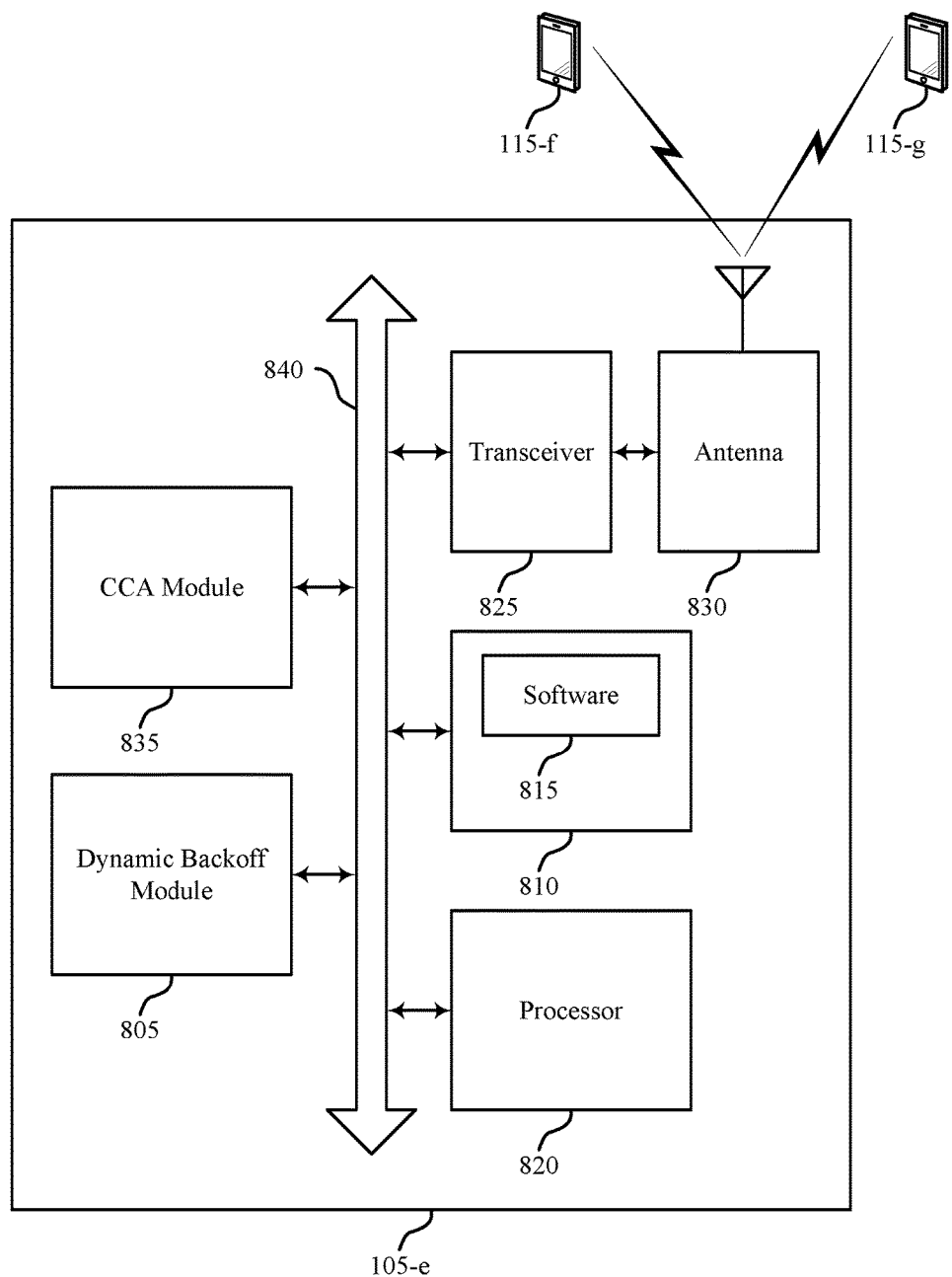
FIG. 8 illustrates a block diagram of a system including an access point (AP) that supports a backoff mechanism for dynamic CCA in accordance with aspects of the present disclosure.

FIG. 8 shows a diagram of a system 800 including a device that supports a backoff mechanism for dynamic CCA in accordance with various aspects of the present disclosure. For example, system 800 may include AP 105-e, which may be an example of a wireless device 400, a wireless device 500, or an AP 105 as described with reference to FIGS. 1 through 6.

AP 105-e may also include dynamic backoff module 805, memory 810, processor 820, transceiver 825, antenna 830 and CCA module 835. Each of these modules may communicate, directly or indirectly, with one another (e.g., via one or more buses 840). The dynamic backoff module 805 may be an example of a dynamic backoff module as described with reference to FIGS. 4 through 6.

The memory 810 may include RAM and ROM. The memory 810 may store computer-readable, computer-executable software including instructions that, when executed, cause the processor to perform various functions described herein (e.g., backoff mechanisms for dynamic CCA, etc.). In some cases, the software 815 may not be directly executable by the processor but may cause a computer (e.g., when compiled and executed) to perform functions described herein. The processor 820 may include an intelligent hardware device, (e.g., a CPU, a microcontroller, an ASIC, etc.).

The transceiver 825 may communicate bi-directionally, via one or more antennas, wired, or wireless links, with one or more networks, as described above. For example, the transceiver 825 may communicate bi-directionally with an AP 105 or a STA 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 730, which may be capable of concurrently transmitting or receiving multiple wireless transmissions. The CCA module 835 may perform an LBT procedure including a CCA, as described above.

Figure 9:
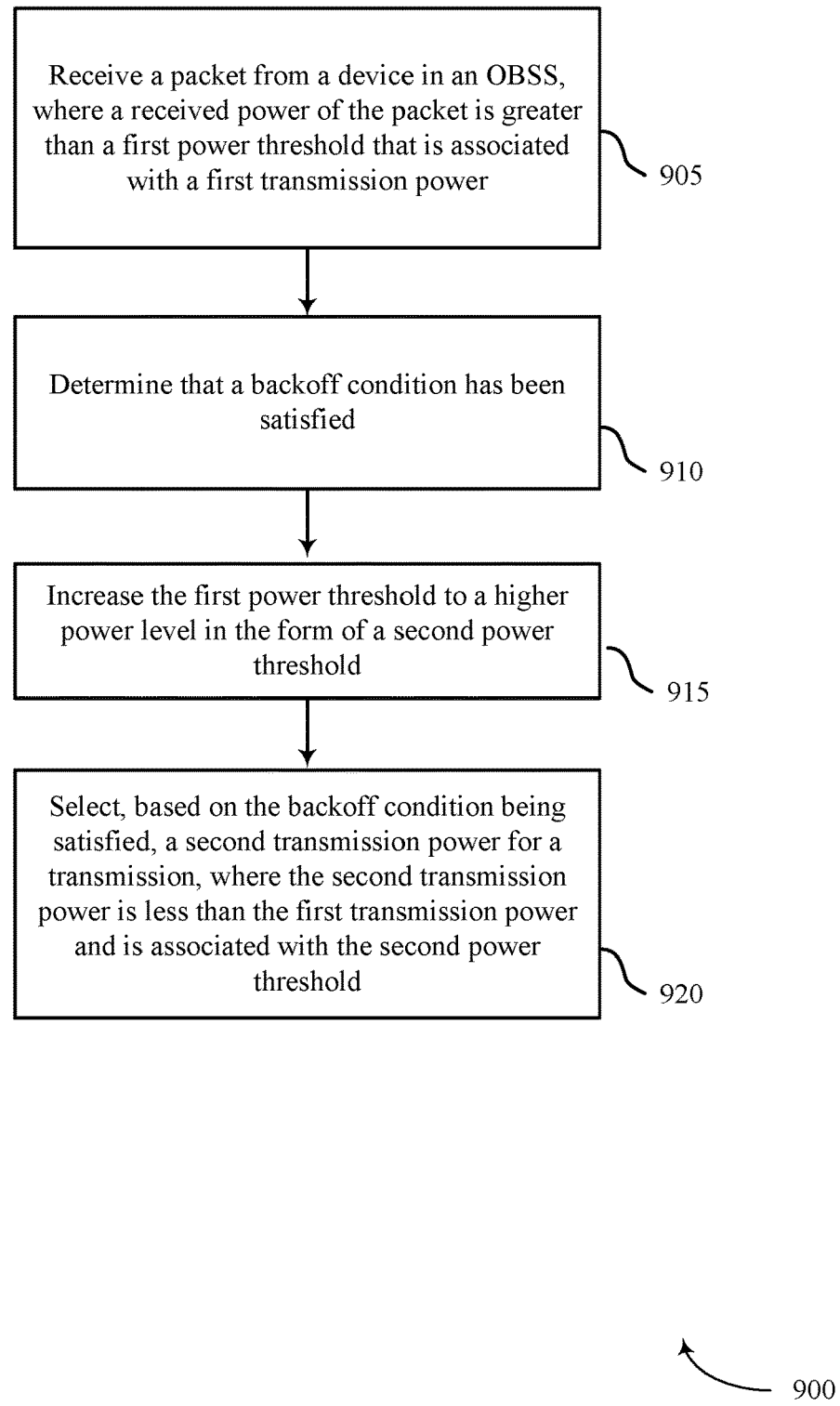
FIGS. 9 through 13 illustrate methods that support a backoff mechanism for dynamic CCA in accordance with aspects of the present disclosure.

FIG. 9 shows a flowchart illustrating a method 900 that supports a backoff mechanism for dynamic CCA in accordance with various aspects of the present disclosure. The operations of method 900 may be implemented by a device, such as a STA 115 or AP 105, or its components as described with reference to FIGS. 1, 2, and 3. For example, the operations of method 900 may be performed by the dynamic backoff module as described herein. In some examples, the STA 115 or AP 105 may execute a set of codes to control the functional elements of the device to perform the functions described below. Additionally or alternatively, the STA 115 or AP 105 may perform aspects of the functions described below using special-purpose hardware.

At block 905, the STA 115 or AP 105 may receive a packet from a device in an OBSS, where a received power of the packet is greater than a first power threshold that is associated with a first transmission power as described above with reference to FIGS. 2 and 3. In certain examples, the operations of block 905 may be performed by the packet detection component as described with reference to FIGS. 5 and 6.

At block 910, the STA 115 or AP 105 may determine that a backoff condition has been satisfied as described above with reference to FIGS. 2 through 3. In certain examples, the operations of block 910 may be performed by the backoff condition component as described with reference to FIGS. 5 and 6.

At block 915, the STA 115 or AP 105 may increase the first power threshold to a higher power level in the form of a second power threshold as described above with reference to FIGS. 2 and 3. In certain examples, the operations of block 915 may be performed by the transmission power component as described with reference to FIGS. 5 and 6.

At block 920, the STA 115 or AP 105 may select, based on the backoff condition being satisfied, a second transmission power for a transmission, where the second transmission power is less than the first transmission power and is associated with the second power threshold as described above with reference to FIGS. 2 through 3. In certain examples, the operations of block 920 may be performed by the transmission power component as described with reference to FIGS. 5 and 6.

Figure 10:
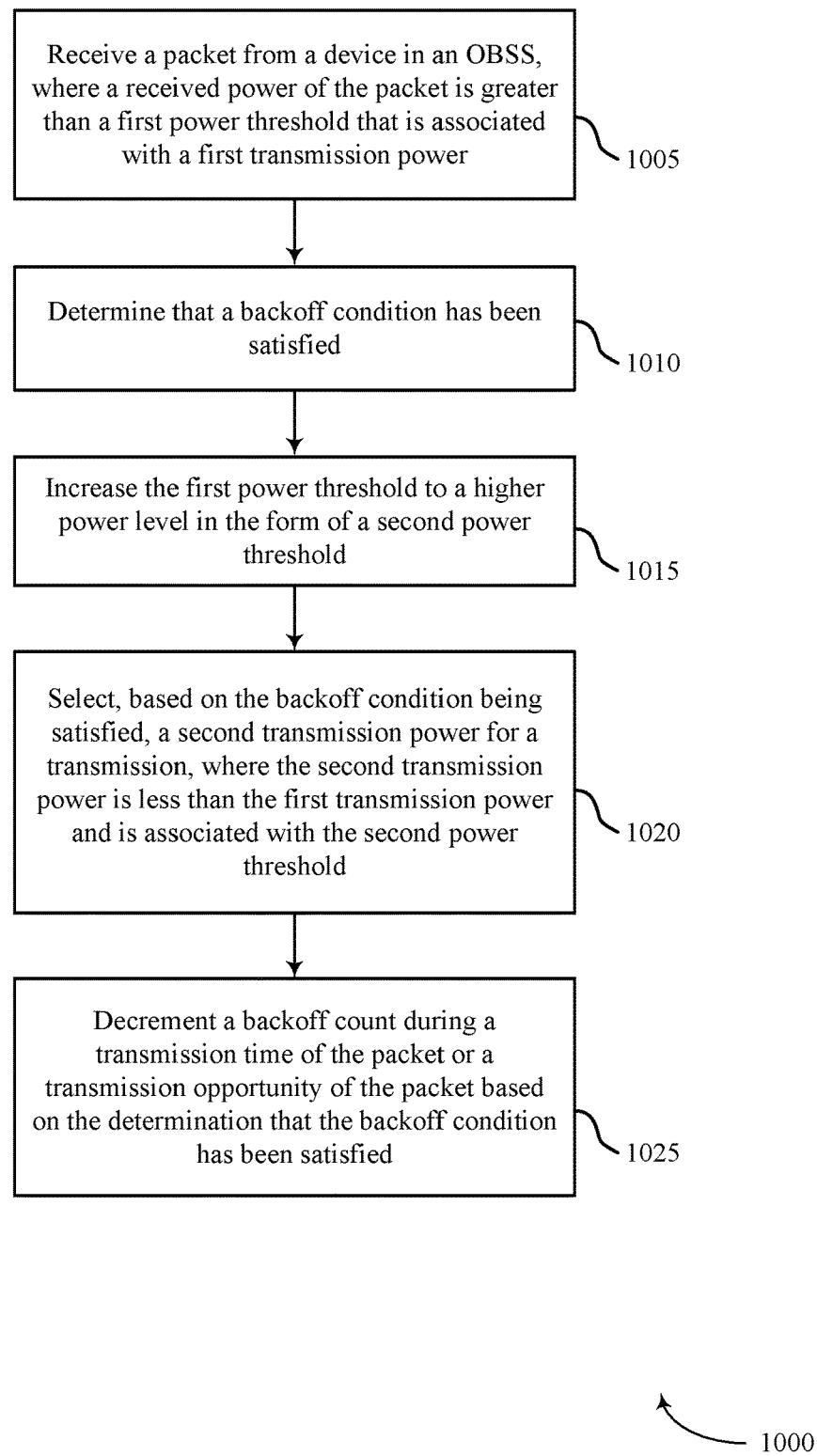

FIG. 10 shows a flowchart illustrating a method 1000 that supports a backoff mechanism for dynamic CCA in accordance with various aspects of the present disclosure. The operations of method 1000 may be implemented by a device, such as a STA 115 or AP 105, or its components as described with reference to FIGS. 1, 2, and 3. For example, the operations of method 1000 may be performed by the dynamic backoff module as described herein. In some examples, the STA 115 or AP 105 may execute a set of codes to control the functional elements of the device to perform the functions described below. Additionally or alternatively, the STA 115 or AP 105 may perform aspects of the functions described below using special-purpose hardware.

At block 1005, the STA 115 or AP 105 may receive a packet from a device in an OBSS, where a received power of the packet is greater than a first power threshold that is associated with a first transmission power as described above with reference to FIGS. 2 and 3. In certain examples, the operations of block 1005 may be performed by the packet detection component as described with reference to FIGS. 5 and 6.

At block 1010, the STA 115 or AP 105 may determine that a backoff condition has been satisfied as described above with reference to FIGS. 2 and 3. In certain examples, the operations of block 1010 may be performed by the backoff condition component as described with reference to FIGS. 5 and 6.

At block 1015, the STA 115 or AP 105 may increase the first power threshold to a higher power level in the form of a second power threshold as described above with reference to FIGS. 2 and 3. In certain examples, the operations of block 1015 may be performed by the transmission power component as described with reference to FIGS. 5 and 6.

At block 1020, the STA 115 or AP 105 may select, based on the backoff condition being satisfied, a second transmission power for a transmission, where the second transmission power is less than the first transmission power and is associated with the second power threshold as described above with reference to FIGS. 2 and 3. In certain examples, the operations of block 1020 may be performed by the transmission power component as described with reference to FIGS. 5 and 6.

At block 1025, the STA 115 or AP 105 may decrement a backoff count during a transmission time of the packet or a transmission opportunity of the packet based on the determination that the backoff condition has been satisfied as described above with reference to FIGS. 2 and 3. In certain examples, the operations of block 1025 may be performed by the backoff count component as described with reference to FIGS. 5 and 6.

Figure 11:
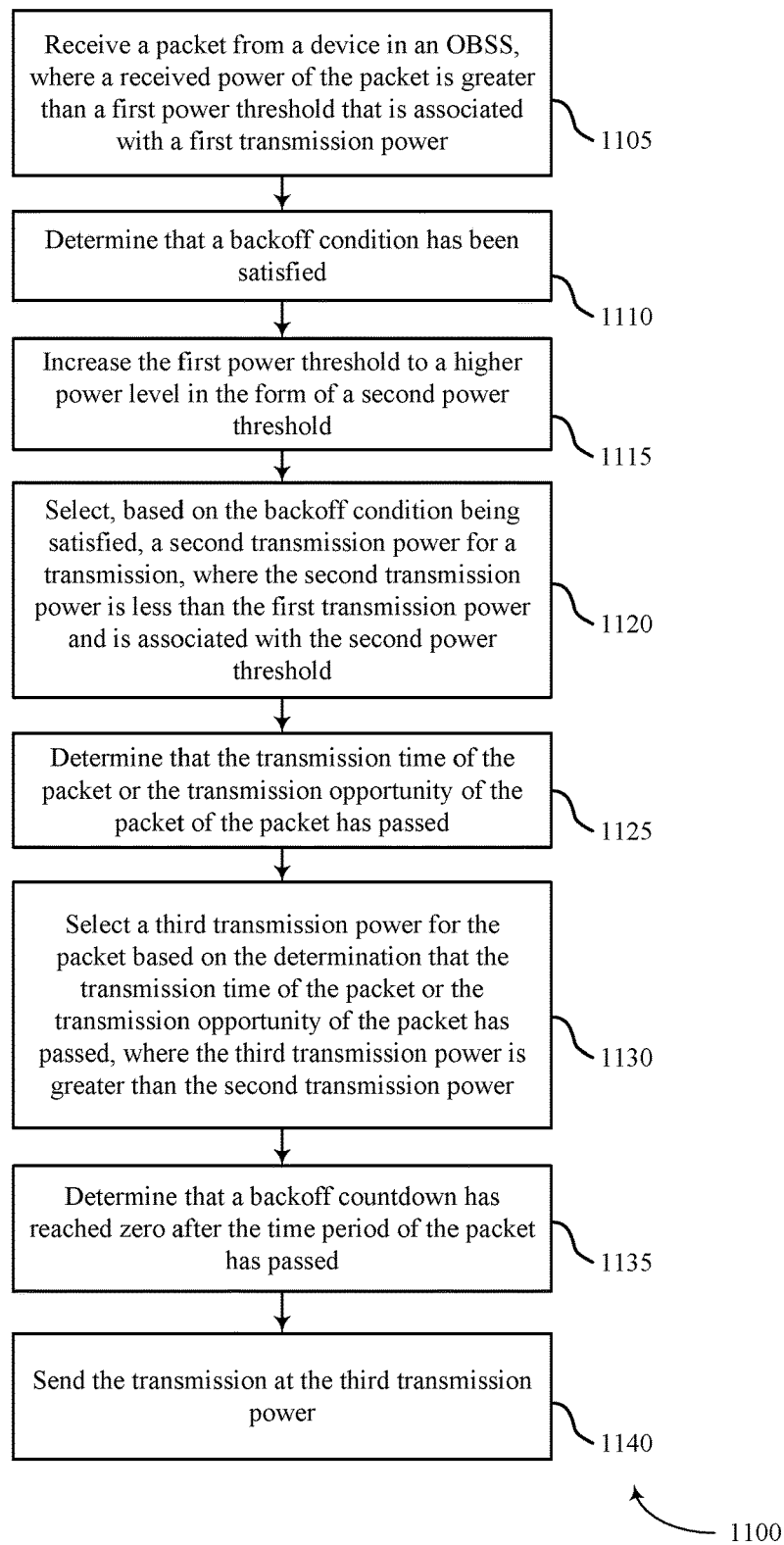

FIG. 11 shows a flowchart illustrating a method 1100 that supports a backoff mechanism for dynamic CCA in accordance with various aspects of the present disclosure. The operations of method 1100 may be implemented by a device, such as a STA 115 or AP 105, or its components as described with reference to FIGS. 1, 2, and 3. For example, the operations of method 1100 may be performed by the dynamic backoff module as described herein. In some examples, the STA 115 or AP 105 may execute a set of codes to control the functional elements of the device to perform the functions described below. Additionally or alternatively, the STA 115 or AP 105 may perform aspects of the functions described below using special-purpose hardware.

At block 1105, the STA 115 or AP 105 may receive a packet from a device in an OBSS, where a received power of the packet is greater than a first power threshold that is associated with a first transmission power as described above with reference to FIGS. 2 and 3. In certain examples, the operations of block 1105 may be performed by the packet detection component as described with reference to FIGS. 5 and 6.

At block 1110, the STA 115 or AP 105 may determine that a backoff condition has been satisfied as described above with reference to FIGS. 2 and 3. In certain examples, the operations of block 1110 may be performed by the backoff condition component as described with reference to FIGS. 5 and 6.

At block 1115, the STA 115 or AP 105 may increase the first power threshold to a higher power level in the form of a second power threshold as described above with reference to FIGS. 2 and 3. In certain examples, the operations of block 1115 may be performed by the transmission power component as described with reference to FIGS. 5 and 6.

At block 1120, the STA 115 or AP 105 may select, based on the backoff condition being satisfied, a second transmission power for a transmission, where the second transmission power is less than the first transmission power and is associated with the second power threshold as described above with reference to FIGS. 2 and 3. In certain examples, the operations of block 1120 may be performed by the transmission power component as described with reference to FIGS. 5 and 6.

At block 1125, the STA 115 or AP 105 may determine that the transmission time of the packet or the transmission opportunity of the packet has passed as described above with reference to FIGS. 2 and 3. In certain examples, the operations of block 1125 may be performed by the packet time determining component as described with reference to FIGS. 5 and 6.

At block 1130, the STA 115 or AP 105 may select a third transmission power for the packet based on the determination that the transmission time of the packet or the transmission opportunity of the packet has passed, where the third transmission power is greater than the second transmission power as described above with reference to FIGS. 2 and 3. In certain examples, the operations of block 1130 may be performed by the transmission power component as described with reference to FIGS. 5 and 6.

At block 1135, the STA 115 or AP 105 may determine that a backoff countdown has reached zero after the transmission time of the packet or the transmission opportunity of the packet has passed as described above with reference to FIGS. 2 and 3. In certain examples, the operations of block 1135 may be performed by the backoff count component as described with reference to FIGS. 5 and 6.

At block 1140, the STA 115 or AP 105 may send the transmission at the third transmission power as described above with reference to FIGS. 2 and 3. In certain examples, the operations of block 1140 may be performed by the transmission power component as described with reference to FIGS. 5 and 6.

Figure 12:
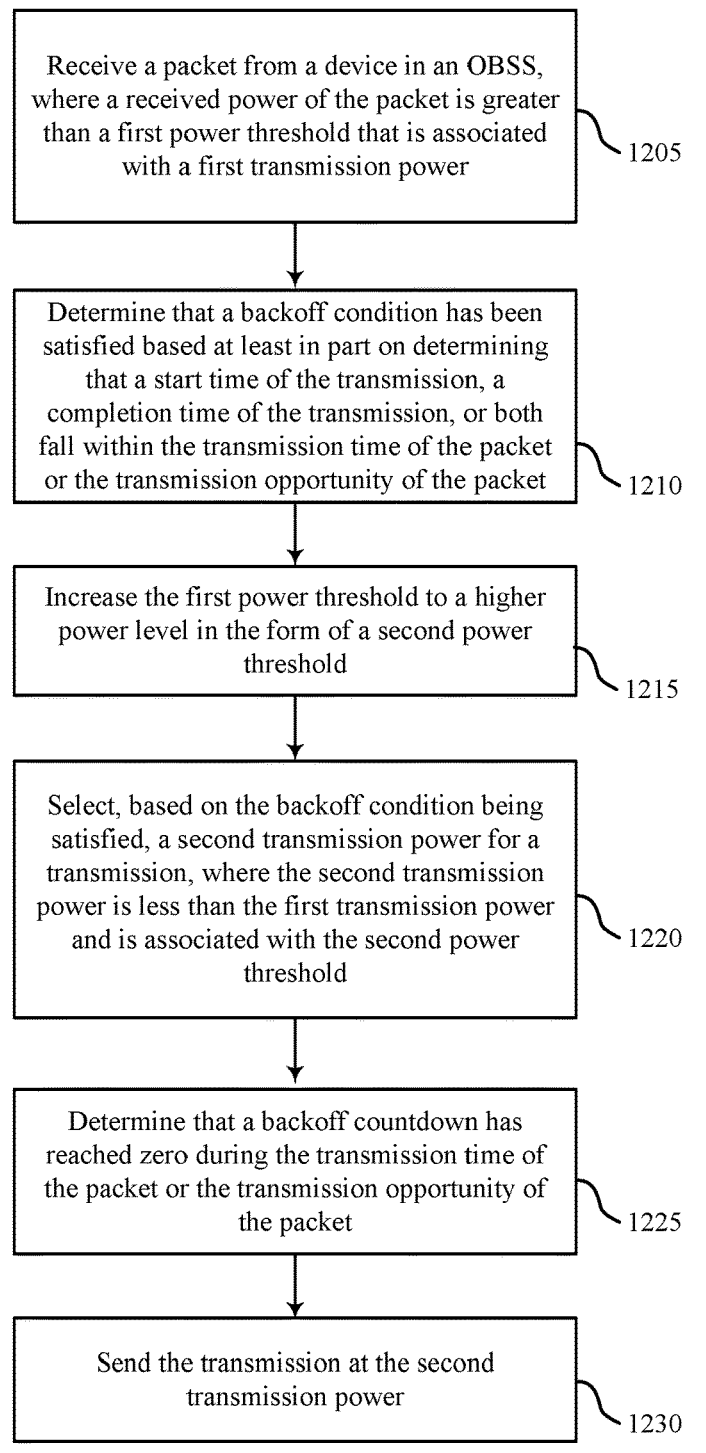

FIG. 12 shows a flowchart illustrating a method 1200 that supports a backoff mechanism for dynamic CCA in accordance with various aspects of the present disclosure. The operations of method 1200 may be implemented by a device, such as a STA 115 or AP 105, or its components as described with reference to FIGS. 1, 2, and 3. For example, the operations of method 1200 may be performed by the dynamic backoff module as described herein. In some examples, the STA 115 or AP 105 may execute a set of codes to control the functional elements of the device to perform the functions described below. Additionally or alternatively, the STA 115 or AP 105 may perform aspects of the functions described below using special-purpose hardware.

At block 1205, the STA 115 or AP 105 may receive a packet from a device in an OBSS, where a received power of the packet is greater than a first power threshold that is associated with a first transmission power as described above with reference to FIGS. 2 and 3. In certain examples, the operations of block 1205 may be performed by the packet detection component as described with reference to FIGS. 5 and 6.

At block 1210, the STA 115 or AP 105 may determine that a backoff condition has been satisfied as described above with reference to FIGS. 2 and 3. In some cases, determining that the backoff condition has been satisfied includes determining that a start time of the transmission, a completion time of the transmission, or both fall within the transmission time of the packet or the transmission opportunity of the packet. In certain examples, the operations of block 1210 may be performed by the backoff condition component as described with reference to FIGS. 5 and 6.

At block 1215, the STA 115 or AP 105 may increase the first power threshold to a higher power level in the form of a second power threshold as described above with reference to FIGS. 2 and 3. In certain examples, the operations of block 1215 may be performed by the transmission power component as described with reference to FIGS. 5 and 6.

At block 1220, the STA 115 or AP 105 may select, based on the backoff condition being satisfied, a second transmission power for a transmission, where the second transmission power is less than the first transmission power and is associated with the second power threshold as described above with reference to FIGS. 2 and 3. In certain examples, the operations of block 1220 may be performed by the transmission power component as described with reference to FIGS. 5 and 6.

At block 1225, the STA 115 or AP 105 may determine that a backoff countdown has reached zero during the transmission time of the packet or the transmission opportunity of the packet as described above with reference to FIGS. 2 and 3. In certain examples, the operations of block 1225 may be performed by the backoff count component as described with reference to FIGS. 5 and 6.

At block 1230, the STA 115 or AP 105 may send the transmission at the second transmission power as described above with reference to FIGS. 2 and 3. In certain examples, the operations of block 1230 may be performed by the transmission power component as described with reference to FIGS. 5 and 6.

Figure 13:
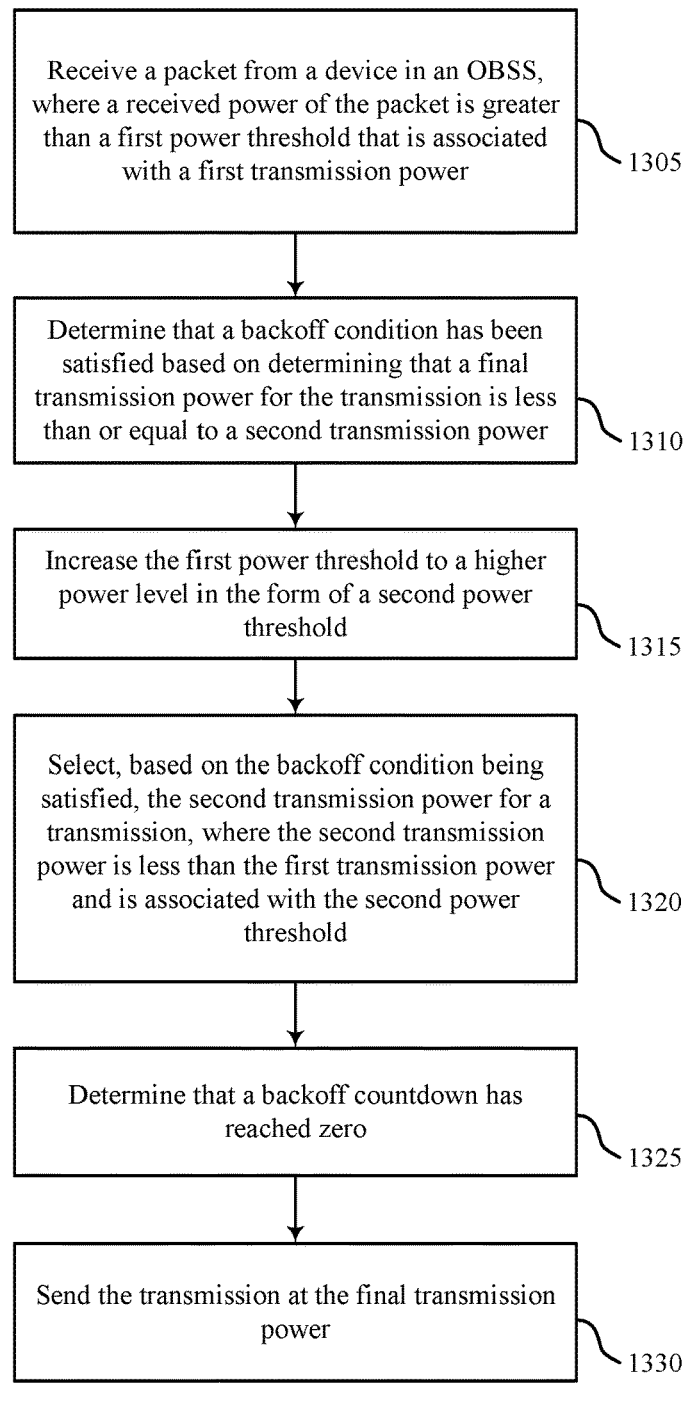

FIG. 13 shows a flowchart illustrating a method 1300 that supports a backoff mechanism for dynamic CCA in accordance with various aspects of the present disclosure. The operations of method 1300 may be implemented by a device, such as a STA 115 or AP 105, or its components as described with reference to FIGS. 1, 2, and 3. For example, the operations of method 1300 may be performed by the dynamic backoff module as described herein. In some examples, the STA 115 or AP 105 may execute a set of codes to control the functional elements of the device to perform the functions described below. Additionally or alternatively, the STA 115 or AP 105 may perform aspects of the functions described below using special-purpose hardware.

At block 1305, the STA 115 or AP 105 may receive a packet from a device in an OBSS, where a received power of the packet is greater than a first power threshold that is associated with a first transmission power as described above with reference to FIGS. 2 and 3. In certain examples, the operations of block 1305 may be performed by the packet detection component as described with reference to FIGS. 5 and 6.

At block 1310, the STA 115 or AP 105 may determine that a backoff condition has been satisfied as described above with reference to FIGS. 2 and 3. In some cases, determining that the backoff condition has been satisfied includes determining that a final transmission power for the transmission is less than or equal to a second transmission power. In certain examples, the operations of block 1310 may be performed by the backoff condition component as described with reference to FIGS. 5 and 6.

At block 1315, the STA 115 or AP 105 may increase the first power threshold to a higher power level in the form of a second power threshold as described above with reference to FIGS. 2 and 3. In certain examples, the operations of block 1315 may be performed by the transmission power component as described with reference to FIGS. 5 and 6.

At block 1320, the STA 115 or AP 105 may select, based on the backoff condition being satisfied, a second transmission power for a transmission, where the second transmission power is less than the first transmission power and is associated with the second power threshold as described above with reference to FIGS. 2 and 3. In certain examples, the operations of block 1320 may be performed by the transmission power component as described with reference to FIGS. 5 and 6.

At block 1325, the STA 115 or AP 105 may determine that a backoff countdown has reached zero as described above with reference to FIGS. 2 and 3. In certain examples, the operations of block 1325 may be performed by the backoff count component as described with reference to FIGS. 5 and 6.

At block 1330, the STA 115 or AP 105 may send the transmission at the final transmission power as described above with reference to FIGS. 2 and 3. In certain examples, the operations of block 1330 may be performed by the transmission power component as described with reference to FIGS. 5 and 6.

It should be noted that the methods 900, 1000, 1100, 1200, and 1300 are just possible implementations, and that the operations of the methods 900, 1000, 1100, 1200, and 1300 may be rearranged or otherwise modified such that other implementations are possible. In some examples, aspects from two or more of the methods 900, 1000, 1100, 1200, or 1300 described with reference to FIG. 9, 10, 11, 12, or 13 may be combined. For example, aspects of each of the methods may include steps or aspects of the other methods, or other steps or techniques described herein. Thus, aspects of the disclosure may provide that supports a backoff mechanism for dynamic CCA.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C). As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Thus, aspects of the disclosure may provide that supports a backoff mechanism for dynamic CCA. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
   receiving a packet from a device in an overlapping basic service set (OBSS), wherein a received power of the received packet is greater than a first power threshold that is associated with a first transmission power;
   determining that a backoff condition has been satisfied;
   increasing the first power threshold to a higher power level in the form of a second power threshold;
   selecting, based at least in part on the backoff condition being satisfied, a second transmission power for a transmission, wherein the second transmission power is less than the first transmission power and is associated with the second power threshold
   determining that a transmission time of the received packet or a transmission opportunity of the received packet has passed; and
   selecting a third transmission power for the transmission based at least in part on the determination that the transmission time of the received packet or the transmission opportunity of the received packet has passed, wherein the third transmission power is greater than the second transmission power.

2. The method of claim 1, further comprising:
decrementing a backoff count during a transmission time of the received packet or a transmission opportunity of the received packet based at least in part on the determination that the backoff condition has been satisfied.

3. The method of claim 1, further comprising:
determining that a backoff countdown has reached zero after the transmission time of the received packet or the transmission opportunity of the received packet has passed; and
sending the transmission at the third transmission power.

4. The method of claim 1, wherein determining that the backoff condition has been satisfied comprises:
determining that the received power is less than a maximum power threshold, the method further comprising:
sending the transmission at the second transmission power based at least in part on the determining.

5. The method of claim 1, wherein determining that the backoff condition has been satisfied comprises:
determining that a start time of the transmission, a completion time of the transmission, or both fall within a transmission time of the received packet or a transmission opportunity of the received packet.

6. The method of claim 5, further comprising:
determining that a backoff countdown has reached zero during the transmission time of the received packet or the transmission opportunity of the received packet; and
sending the transmission at the second transmission power.

7. The method of claim 1, wherein determining that the backoff condition has been satisfied comprises:
determining that a final transmission power for the transmission is less than or equal to the second transmission power.

8. The method of claim 7, further comprising:
determining that a backoff countdown has reached zero; and
sending the transmission at the final transmission power.

9. An apparatus for wireless communication comprising:
means for receiving a packet from a device in an overlapping basic service set (OBSS), wherein a received power of the received packet is greater than a first power threshold that is associated with a first transmission power;
means for determining that a backoff condition has been satisfied;
means for increasing the first power threshold to a higher power level in the form of a second power threshold;
means for selecting, based at least in part on the backoff condition being satisfied, a second transmission power for a transmission, wherein the second transmission power is less than the first transmission power and is associated with the second power threshold;
means for determining that a transmission time of the received packet or a transmission opportunity of the received packet has passed; and
means for selecting a third transmission power for the transmission based at least in part on the determination that the transmission time of the received packet or the transmission opportunity of the received packet has passed, wherein the third transmission power is greater than the second transmission power.

10. The apparatus of claim 9, further comprising:
means for decrementing a backoff count during a transmission time of the received packet or a transmission opportunity of the received packet based at least in part on the determination that the backoff condition has been satisfied.

11. The apparatus of claim 9, further comprising:
means for determining that a backoff countdown has reached zero after the transmission time of the received packet or the transmission opportunity of the received packet has passed; and
means for sending the transmission at the third transmission power.

12. The apparatus of claim 9, wherein the means for determining that the backoff condition has been satisfied comprise:
means for determining that the received power is less than a maximum power threshold, the apparatus further comprising:
means for sending the transmission at the second transmission power based at least in part on the determining.

13. The apparatus of claim 9, wherein the means for determining that the backoff condition has been satisfied comprise:
means for determining that a start time of the transmission, a completion time of the transmission, or both fall within a transmission time of the received packet or a transmission opportunity of the received packet.

14. The apparatus of claim 13, further comprising:
means for determining that a backoff countdown has reached zero during the transmission time of the received packet or the transmission opportunity of the received packet; and
means for sending the transmission at the second transmission power.

15. The apparatus of claim 9, wherein the means for determining that the backoff condition has been satisfied comprise:
means for determining that a final transmission power for the transmission is less than or equal to the second transmission power.

16. The apparatus of claim 15, further comprising:
means for determining that a backoff countdown has reached zero; and
means for sending the transmission at the final transmission power.

17. An apparatus for wireless communication, comprising:
a processor;
memory in electronic communication with the processor; and
instructions stored in the memory and executable by the processor to cause the apparatus to:
receive a packet from a device in an overlapping basic service set (OBSS), wherein a received power of the received packet is greater than a first power threshold that is associated with a first transmission power;
determine that a backoff condition has been satisfied;
increase the first power threshold to a higher power level in the form of a second power threshold;
select, based at least in part on the backoff condition being satisfied, a second transmission power for a transmission, wherein the second transmission power is less than the first transmission power and is associated with the second power;

determine that a transmission time of the received packet or a transmission opportunity of the received packet has passed; and select a third transmission power for the transmission based at least in part on the determination that the transmission time of the received packet or the transmission opportunity of the received packet has passed, wherein the third transmission power is greater than the second transmission power.

18. The apparatus of claim 17, wherein the instructions are executable by the processor to cause the apparatus to:
decrement a backoff count during a transmission time of the received packet or a transmission opportunity of the received packet based at least in part on the determination that the backoff condition has been satisfied.

19. The apparatus of claim 17, wherein the instructions are executable by the processor to cause the apparatus to:
determine that a backoff countdown has reached zero after the transmission time of the received packet or the transmission opportunity of the received packet has passed; and
send the transmission at the third transmission power.

20. The apparatus of claim 17, wherein the instructions executable by the processor to cause the apparatus to determine that the backoff condition has been satisfied comprise instructions executable by the processor to cause the apparatus to:
determine that the received power is less than a maximum power threshold, the instructions further executable by the processor to cause the apparatus to:
send the transmission at the second transmission power based at least in part on the determining.

21. The apparatus of claim 17, wherein the instructions executable by the processor to cause the apparatus to determine that the backoff condition has been satisfied comprise instructions executable by the processor to cause the apparatus to:
determine that a start time of the transmission, a completion time of the transmission, or both fall within a transmission time of the received packet or a transmission opportunity of the received packet.

22. The apparatus of claim 21, wherein the instructions are executable by the processor to cause the apparatus to:
determine that a backoff countdown has reached zero during the transmission time of the received packet or the transmission opportunity of the received packet; and
send the transmission at the second transmission power.

23. The apparatus of claim 17, wherein the instructions executable by the processor to cause the apparatus to determine that the backoff condition has been satisfied comprise instructions executable by the processor to cause the apparatus to:
determine that a final transmission power for the transmission is less than or equal to the second transmission power.

24. The apparatus of claim 23, wherein the instructions are executable by the processor to cause the apparatus to:
determine that a backoff countdown has reached zero; and
send the transmission at the final transmission power.

25. A non-transitory computer-readable medium storing code for wireless communications, the code comprising instructions executable to:
receive a packet from a device in an overlapping basic service set (OBSS), wherein a received power of the received packet is greater than a first power threshold that is associated with a first transmission power;
determine that a backoff condition has been satisfied;
increase the first power threshold to a higher power level in the form of a second power threshold;
select, based at least in part on the backoff condition being satisfied, a second transmission power for a transmission, wherein the second transmission power is less than the first transmission power and is associated with the second power threshold;
determine that a transmission time of the received packet or a transmission opportunity of the received packet has passed; and
select a third transmission power for the transmission based at least in part on the determination that the transmission time of the received packet or the transmission opportunity of the received packet has passed, wherein the third transmission power is greater than the second transmission power.

26. The non-transitory computer-readable medium of claim 25, wherein the instructions are executable to:
decrement a backoff count during a transmission time of the received packet or a transmission opportunity of the received packet based at least in part on the determination that the backoff condition has been satisfied.

27. The non-transitory computer-readable medium of claim 25, wherein the instructions are executable to:
determine that a backoff countdown has reached zero after the transmission time of the received packet or the transmission opportunity of the received packet has passed; and
send the transmission at the third transmission power.

28. The non-transitory computer-readable medium of claim 25, wherein the instructions executable to determine that the backoff condition has been satisfied comprise instructions executable to:
determine that the received power is less than a maximum power threshold, the instructions further executable by the processor to:
send the transmission at the second transmission power based at least in part on the determining.

29. The non-transitory computer-readable medium of claim 25, wherein the instructions executable to determine that the backoff condition has been satisfied comprise instructions executable to:
determine that a start time of the transmission, a completion time of the transmission, or both fall within a transmission time of the received packet or a transmission opportunity of the received packet.

30. The non-transitory computer-readable medium of claim 29, wherein the instructions are executable to:
determine that a backoff countdown has reached zero during the transmission time of the received packet or the transmission opportunity of the received packet; and
send the transmission at the second transmission power.

31. The non-transitory computer-readable medium of claim 25, wherein the instructions executable to determine that the backoff condition has been satisfied comprise instructions executable to:
determine that a final transmission power for the transmission is less than or equal to the second transmission power.

32. The non-transitory computer-readable medium of claim 31, wherein the instructions are executable to:
determine that a backoff countdown has reached zero; and
send the transmission at the final transmission power.

* * * * *